United States Patent
Walters

(10) Patent No.: US 6,188,956 B1
(45) Date of Patent: Feb. 13, 2001

(54) NAVIGATION DEVICE AND METHOD FOR SELECTIVELY DISPLAYING THOROUGHFARE NAMES

(75) Inventor: Thomas H. Walters, Gardner, KS (US)

(73) Assignee: Garmin Corporation (TW)

( * ) Notice: Under 35 U.S.C. 154(b), the term of this patent shall be extended for 0 days.

(21) Appl. No.: 09/223,554

(22) Filed: Dec. 30, 1998

(51) Int. Cl.$^7$ .................................................. G06F 165/00
(52) U.S. Cl. ........................... 701/200; 701/23; 701/25; 701/208; 701/211; 701/212; 340/990; 340/995
(58) Field of Search ................................. 701/23, 25, 26, 701/200, 208, 209, 210, 211, 212; 340/990, 995; 73/178 R

(56) References Cited

U.S. PATENT DOCUMENTS

| | | | |
|---|---|---|---|
| D. 291,288 | 8/1987 | Suzuki | D10/78 |
| D. 301,882 | 6/1989 | Watanabe | D14/140 |
| D. 302,271 | 7/1989 | Watanabe | D14/140 |
| D. 314,713 | 2/1991 | Ciranny et al. | D10/65 |
| D. 326,450 | 5/1992 | Watanabe | D14/138 |
| D. 337,582 | 7/1993 | Lewo | D14/144 |
| D. 365,032 | 12/1995 | Laverick et al. | D10/78 |
| D. 365,292 | 12/1995 | Laverick et al. | D10/78 |
| 4,050,798 | 9/1977 | Boggs | 353/35 |
| 4,754,465 | 6/1988 | Trimble | 375/1 |
| 4,796,189 * | 1/1989 | Nakayama et al. | 701/208 |
| 4,868,715 | 9/1989 | Putman et al. | 361/422 |
| 4,969,647 | 11/1990 | Mical et al. | 273/85 |
| 5,068,765 | 11/1991 | Nimpoeno | 361/422 |
| 5,103,377 | 4/1992 | Kobayashi et al. | 361/394 |
| 5,204,817 | 4/1993 | Yoshida | 364/449 |
| 5,225,842 | 7/1993 | Brown et al. | 342/357 |
| 5,229,925 | 7/1993 | Spencer et al. | 361/422 |
| 5,323,164 | 6/1994 | Endo | 342/357 |
| 5,333,116 | 7/1994 | Hawkins et al. | 364/708.1 |
| 5,408,385 | 4/1995 | Fowler et al. | 361/784 |
| 5,434,789 | 7/1995 | Fraker et al. | 364/460 |
| 5,884,219 * | 3/1999 | Curtwright et al. | 701/213 |
| 5,936,553 * | 8/1999 | Kabel | 340/995 |

\* cited by examiner

*Primary Examiner*—William A. Cuchlinski, Jr.
*Assistant Examiner*—Gertrude Arthur
(74) *Attorney, Agent, or Firm*—Shook, Hardy & Bacon LLP

(57) ABSTRACT

A navigation device for selectively displaying thoroughfare names utilizes a processor, memory, display, input and antenna/receiver. The navigation device, incorporated within a vehicle receives GPS satellite signals from a plurality of satellites orbiting the earth and calculates its position, velocity and direction. Cartographic data, including data indicative of thoroughfares and their corresponding names is stored in the memory and displayed on the display along with an icon indicative of the location of the vehicle. As the vehicle is navigated along a thoroughfare displayed on the display, the processor causes the display to display the names of thoroughfares which, in one embodiment, intersect with the thoroughfare being navigated; in another embodiment are crosswise with the thoroughfare being navigated. Preferably, only the names of thoroughfares which intersect or are oriented crosswise with the thoroughfare being navigated within a selected angle from perpendicular to the thoroughfare being navigated are displayed. The invention thus displays the thoroughfare names that are most likely of interest without cluttering the display.

23 Claims, 2 Drawing Sheets

NAVIGATION DEVICE AND METHOD FOR SELECTIVELY DISPLAYING THOROUGHFARE NAMES

BACKGROUND OF THE INVENTION

1. Field of the Invention

The present invention is generally directed to an electronic navigational device employing a receiver for receiving GPS satellite signals. More particularly, the present invention is directed to an electronic navigation device and a method for selectively displaying the names of thoroughfares stored in a memory device.

2. Description of the Related Art

Electronic navigation devices employing GPS receivers have become increasingly popular in recent years. The device is utilized in an electronic navigation system which permits a user of the system to determine his or her position with respect to the earth. Such navigation devices are extremely useful in navigational vehicles of all types, including aircraft, marine craft, and land vehicles. Additionally, the device is useful for tracking purposes, and hand held versions are popular with hikers and campers. Very generally, conventional electronic navigation devices employ a receiver which detects signals from a number of satellites orbiting the earth. The processor within the navigation device computes the location of the device, based upon data received from the received satellite signals, after a sufficient number of GPS satellite signals have been acquired. Particularly, once a sufficient number of GPS satellite signals are acquired, the device is able to calculate its position with respect to the various satellites. Thus, an electronic navigation device employing a GPS receiver has the ability to accurately compute the position of the device in real time, even as the device moves. Additionally, the device is able to calculate the velocity and direction in which the device is moving in three dimensions.

U.S. Pat. No. 5,323,164 to Endo teaches a satellite radio wave capturing method for global positioning system receiver. U.S. Pat. No. 5,225,842 to Brown, et al. teaches a vehicle tracking system employing global position satellites. Each of these patents is incorporated herein by reference.

Users of navigation equipment seek intuitive representations of navigation information which are direct and simple to interpret. Particularly, the ability of a navigation device to present navigation information in a manner that is simple to interpret is particularly important to individuals navigating a land vehicle, since the operator of the vehicle does not want to have to spend significant time interpreting displayed navigation data.

Conventional navigational devices have electronic maps stored in memory. Particularly, data indicative of geography and thoroughfares are stored in memory. One such conventional navigation device are used in combination with a vehicle, such as an automobile, the navigation device calculates its location and provides an icon on the display screen, relative to displayed electronic map, to indicate to the operator of the vehicle the position and movement of the vehicle relative to surrounding geography. Typically, the electronic maps are displayed two dimensionally, although the electronic map data may also be transformed to a perspective view.

In conventional GPS navigation devices, each thoroughfare has an associated name stored in memory. Thus, upon display of a particular thoroughfare on the display of the navigation device, the name of that thoroughfare can also be displayed to indicate to the user the identity of the thoroughfare being displayed. As will be appreciated, in heavily populated areas, such as cities, there are a great number of thoroughfares in close proximity to each other. This presents a problem in displaying the names of each thoroughfare, due to the fact that the display screens on conventional navigational devices are not large enough to adequately show all of the names of closely related thoroughfares. More specifically, when thoroughfares are arranged in a grid pattern, such as city blocks which are often arranged, the names of streets oriented in one direction often overlap with the names of streets oriented in another direction on the display of the navigation device. In such a case, the displayed information is obviously not at all intuitive and, in fact, presents overlapping text which is extremely difficult, or impossible, to read. In response to this problem, methods have been implemented to eliminate the names of some of the roads for display of the cartographic information on the navigation device, so as to prevent the overlapping of names. While a variety of approaches are taken, these approaches result in randomly named streets appearing on the display, while the names of other streets or roads do not appear.

Accordingly, the need exists for a navigation device and method for displaying the names of thoroughfares on a navigation device which are most likely to be of interest to the navigator of a land vehicle. The present invention fulfills this need, and other needs, and overcomes the drawbacks of the prior art.

SUMMARY OF THE INVENTION

The present invention is a unique electronic navigation device, and method, for selectively displaying the names of thoroughfares on the display of a navigation device. The device includes a housing for housing a processor, and a keypad input unit, a memory, a display having a display screen, and an antenna, all of which are connected to the processor. The navigation device is operable to acquire satellite signals from global positioning satellites and compute a geographic location of the device in a conventional manner. The navigation device and method of the present invention is preferably incorporated in a unit to be mounted in a land vehicle, such as an automobile or truck. Cartographic data, including names of various geographical locations and, particularly, the names of thoroughfares, is stored in memory.

In operation, the electronic navigation device is mounted in a land vehicle. As the vehicle is navigated along a thoroughfare, the navigation device calculates its position, direction of travel, and velocity. Electronic map data corresponding to the geograph surrounding the vehicle is displayed on the display of the navigation device. Utilizing the electronic map data and the current position of the navigation device, the processor determines which thoroughfare is being navigated in a conventional manner.

As stated, a particular problem with prior art devices is the display of all of the names of thoroughfares on the display screen of the navigation devices, particularly in highly populated areas which have many thoroughfares in close proximity and, additionally, which result in many intersections. In order to overcome this problem, the present invention, after calculating the location of the navigation device and the thoroughfare upon which the vehicle employing the navigation device is being navigated, displays the names of only selected ones of the thoroughfares stored in memory. Particularly, in one embodiment, the processor determines which thoroughfares intersect with the thoroughfare being navigated, and displays the name of only those thoroughfares which intersect the thoroughfare being navigated. This unique solution to the problem of displaying thoroughfare names on the display of the navigation device provides the navigator of the vehicle with the names of those thoroughfares which are most likely of interest. In this regard, as the vehicle is being navigated on a particular thoroughfare in a first direction, the names of thoroughfares which are running parallel to the navigated thoroughfare, or which do not intersect the thoroughfare being navigated, are most likely not of as much interest as the names of those thoroughfares which will be crossed, or which intersect with the thoroughfare being navigated.

More particularly, it will be understood that the cartographic data is stored in memory and that each thoroughfare contains a series of coordinates (e.g., $x_n$, $y_n$). By analyzing these coordinates, the processor can determine thoroughfares which intersect with the thoroughfare being navigated. In a preferred embodiment, the processor determines those thoroughfares that intersect It with the thoroughfare being navigated within a selected angle, in either direction, from a line drawn perpendicularly to the road being navigated. Preferably, the angle within which the thoroughfares to be named must fall is 45 degrees from perpendicular to the road being navigated.

In accordance with a second embodiment of the invention, the processor determines which thoroughfares are oriented in a direction different from the thoroughfare being navigated and, particularly, are oriented within a selected angle from a line drawn perpendicularly to the thoroughfare being navigated. Preferably, the angle within which the thoroughfares could be named must fall as 45 degrees from perpendicular to the road being navigated. In this embodiment, it is not necessary for a thoroughfare to actually intersect the road being navigated. Rather, as will be appreciated, many thoroughfares may be oriented in a crosswise manner to a road being navigated, but do not actually intersect with the road. Thus, according to this embodiment of the invention, these non-crossing, but cross-wise oriented thoroughfares, are also displayed. According to the broadest form of this embodiment, any road which is oriented in a direction different from the road being navigated has its name displayed in association with a representation of the road.

Depending upon the layout of thoroughfares in a particular area, even utilizing the foregoing principals, there may be times when the name of one road overlaps with the name of another road, thus causing what is termed herein as a collision event. In such a case, the name of one of the thoroughfares is removed, based upon selected criteria. For example, in accordance with conventional cartographic data storage techniques, the thoroughfares stored in the memory of the navigation device are classified. In this regard, interstates may be of one classification, state highways of a second classification, boulevards and trafficways of a third classification, city streets of a fourth classification, and country roads of a fifth classification, and so on. When a collision event is declared, the processor will default to display the name of the road which is in the lowest classification, where the lowest classification consists of the most major type of thoroughfare. If the thoroughfares relating to the collision event are in the same classification type, other criteria can be utilized. For example, a thoroughfare that is furthest away from the vehicle being navigated could have its name eliminated from the display.

In accordance with yet another aspect of the present invention, an area defining a window is reserved at the top of the display of the navigation device. In this window, the name of the next thoroughfare which intersects, or which is aligned crosswise with the thoroughfare being navigated, depending upon the embodiment, is displayed in large letters. Thus, the navigator of the vehicle can quickly determine, without having to closely analyze the cartographic data of the display, the next intersecting or crosswise road, or the next road that is oriented in a direction differently from the road being navigated.

According to the device and method of displaying navigation data according to the present invention, those thoroughfares having a name which is to be displayed on the display of the navigation device are determined as a function of the direction in which the navigation device is being navigated. Thus, according to the invention, and depending upon the embodiment employed, thoroughfares that intersect with the thoroughfare being navigated, or that are oriented in a direction other than the direction being navigated, and, particularly, within a selected angle from perpendicular to the thoroughfare being navigated, are displayed.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
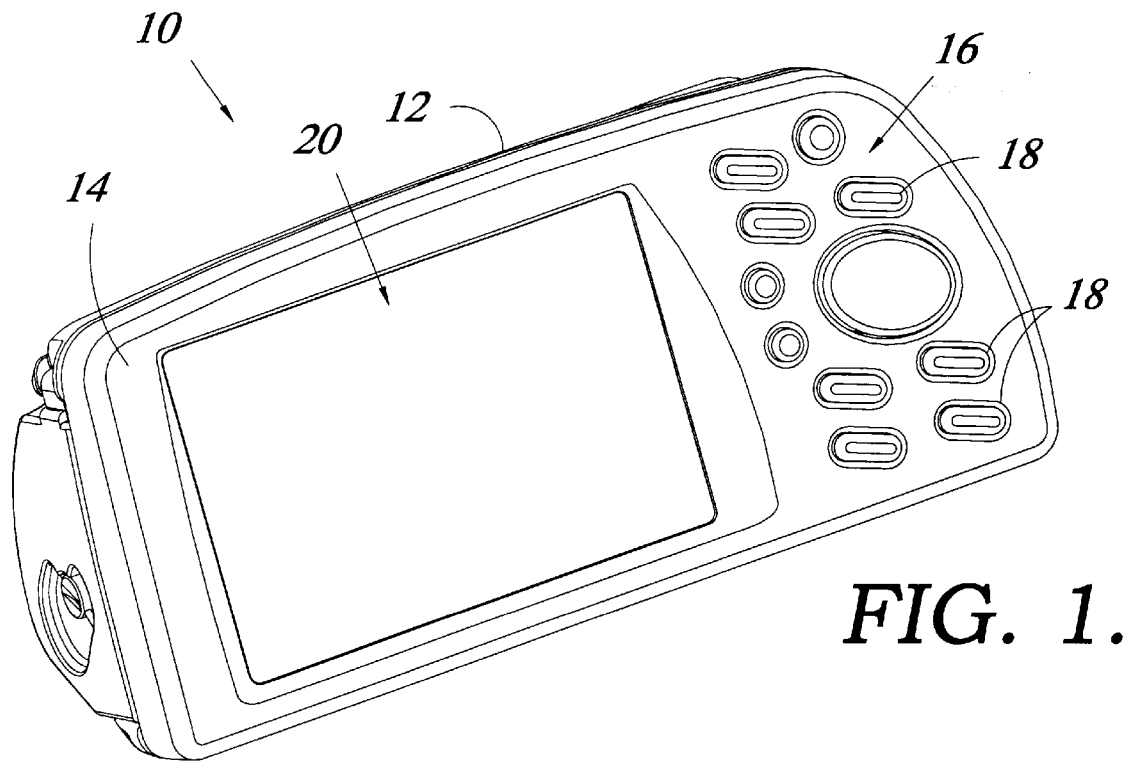
FIG. 1 is a perspective view of a navigation device of the present invention.

With reference initially to FIG. 1, a navigation device of the present invention is designated generally by the reference numeral 10. As illustrated, navigation device 10 has a housing 12, adapted to rest on its surface. Navigation device 10 has as front face 14, including an input area comprised of a keypad 16, with keys 18, and a display designated generally by reference numeral 20, having a display screen 22. It should be understood that the structure of navigation device 10 is shown as illustrative of one type of navigation device. Other physical structures, such as a portable hand held unit, are contemplated within the scope of this invention.

Figure 2:
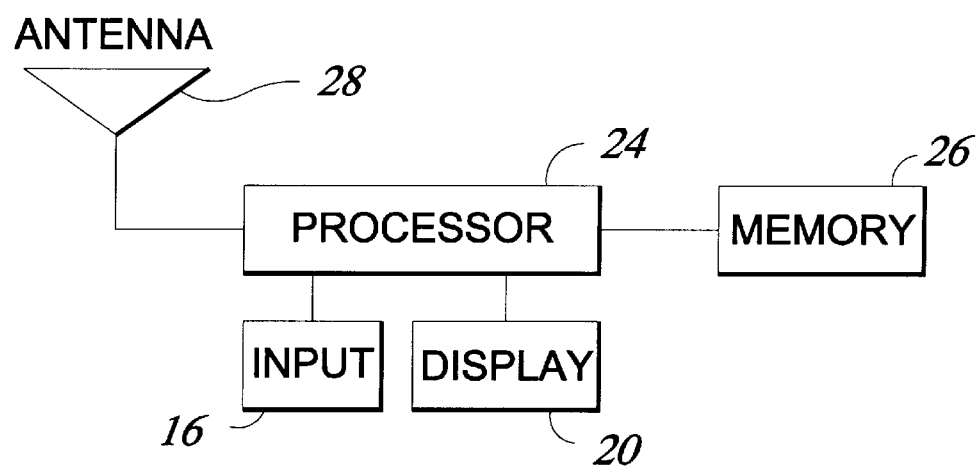
FIG. 2 is a block diagram of the hardware of the navigation device of the present invention.

As illustrated in the block diagram of FIG. 2, navigation device 10 of the present invention includes a processor, designated by reference numeral 24. Keypad 16 and display 20, as well as memory 26 and an antenna 28, are connected to processor 24, as shown. In accordance with the principles of the present invention, and as described in detail below, display 20 displays navigational information, such as data indicative of thoroughfares, with the name of each of selected thoroughfares being displayed on the display, as described in detail below.

Figure 3:
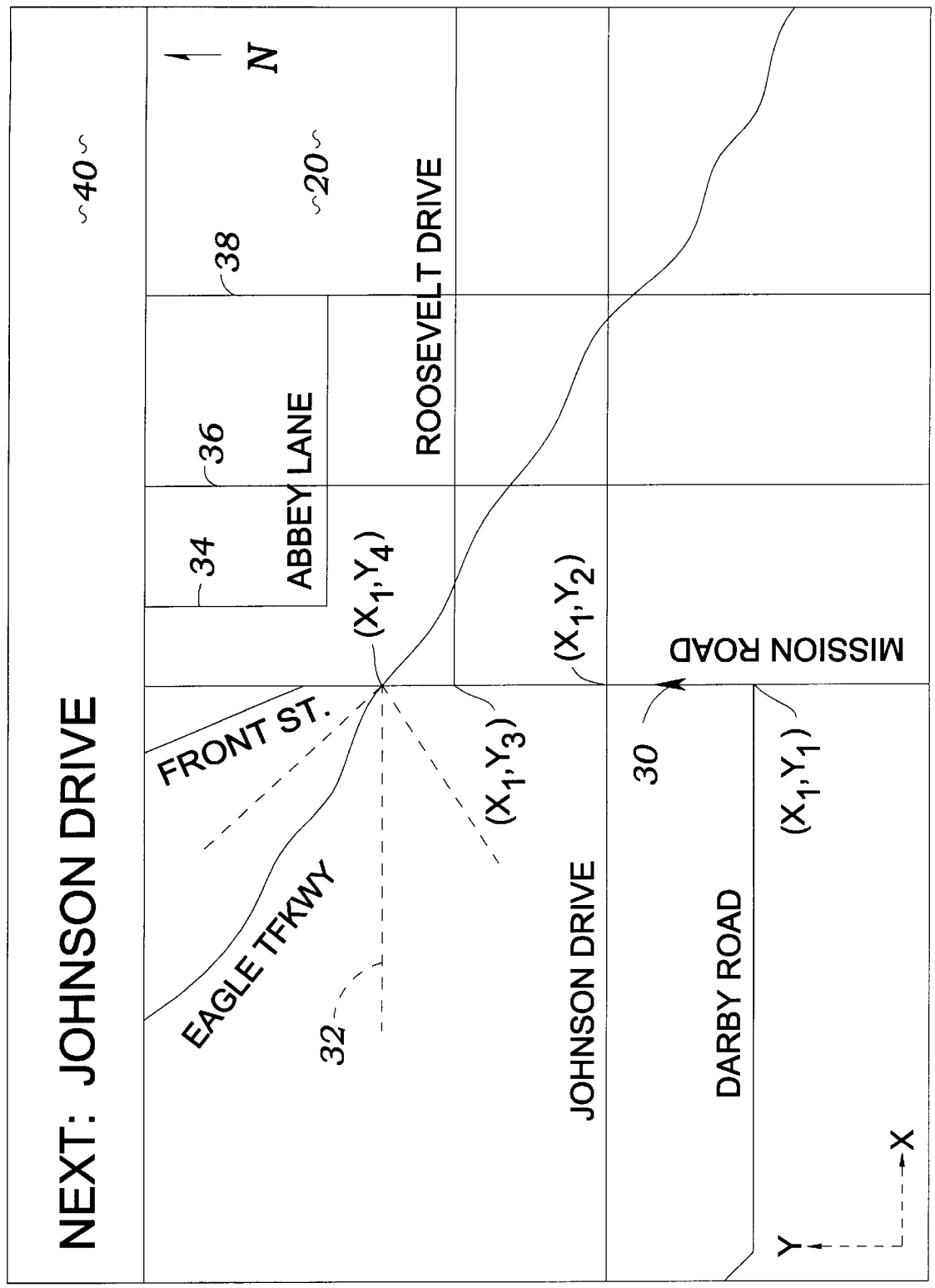
FIG. 3 is a graphical representation of a display screen utilizing the display methodology of the present invention.

With reference to FIGS. 1–3, operation of the navigation device and method of the present invention is shown and described.

In operation and use, navigation device 10 is utilized in conjunction with a vehicle, such as an automobile. In the embodiment shown in FIG. 1, it is preferred that navigation device 10 is mounted on the dash of a vehicle. It should be understood, however, that navigation device 10 of the present invention can be an in-dash mounted device, to provide a more permanent association with the vehicle.

In accordance with conventional techniques, navigation device 10 receives global positioning satellite signals, via antenna 28. Processor 24 utilizes the global positioning satellite signals to determine the location of the device 10, and hence the vehicle. The computation of the location of navigation device 10 is preferably accomplished through triangulation techniques, which are well known in the art. As will be appreciated, the navigation device 10 must acquire at least three satellites in order to be able to compute its two dimensional location.

As illustrated in FIG. 3, once navigation device 10 computes its location, it displays, on display 20, an icon 30 indicative of the location of the vehicle relative to surrounding geography. In particular, the cartographic data is stored in memory, which includes plurality of thoroughfares, is displayed on display 20. Additionally, as will be appreciated and understood, navigation device 10 calculates its speed and direction of travel. Thus, the processor 24 updates the display screen periodically and repositions the icon 30 according to the actual location of the vehicle.

In accordance with the principles of the present invention, the processor 24 displays cartographic data on display 20 in a unique manner. Particularly, each thoroughfare stored in memory has an associated name stored in memory. In displaying the names of thoroughfares on to display 20, the processor favors those thoroughfares which are oriented in a direction different than the general direction of the thoroughfare being navigated. For example, in accordance with one embodiment of the present invention, and in the example provided in FIG. 3, the vehicle, designated by icon 30, is preceding North, or towards the top of the display 20, on Mission Road. At the current time represented, the vehicle is between Darby Road and Johnson Drive. According to this embodiment, since Darby Road and Johnson Drive, Roosevelt Drive, Abbey Lane, Eagle Trafficway, and Front Street are oriented in a direction that is different from Mission Road, each of these names is displayed on the display in association with its corresponding thoroughfare. Thus, processor 24 favors display of the names of those thoroughfares that are oriented in a direction different from the thoroughfare being navigated and, particularly, that are oriented in a generally crosswise fashion to the thoroughfare being navigated.

More particularly, in accordance with another embodiment of the invention, processor 24 displays the name of those thoroughfares which are oriented within a selected angle from a line drawn perpendicularly to the thoroughfare being navigated. More particularly, in accordance with the preferred aspect of the invention, the processor 24 causes display 20 to display the names of only those thoroughfares which are oriented within a 45 degree angle from a line drawn perpendicularly from the thoroughfare being navigated. As illustrated in FIG. 3 in dashed lines, an imaginary line 32 is drawn perpendicularly to the thoroughfare, namely Mission Road, being navigated. Processor 24 determines those thoroughfares which are within 45 degrees, in either direction, from a line drawn perpendicularly to the thoroughfare being navigated, namely Mission Road. Thus, in the example of FIG. 3, Darby Road, Johnson Drive, Roosevelt Drive and Abbey Lane, and Eagle Trafficway all have their name displayed on display 20. In contrast, however, the name of Front Street would not be displayed in this embodiment, since it does not fall within the selected angle.

In yet another embodiment of the present invention, processor 20, rather than displaying the names of thoroughfares oriented substantially crosswise with the thoroughfare being navigated, displays the names of those thoroughfares which intersect the thoroughfare being navigated. In this embodiment, then, Darby Road, Johnson Drive, Roosevelt Drive, Eagle Trafficway, and Front Street would have their corresponding name displayed in association with a representation of the thoroughfare. In contrast, however, Abbey Lane, despite being crosswise with Mission Road, would not have its name displayed since it does not intersect with Mission Road. More specifically, as in the foregoing embodiment, it is preferred that in this embodiment, processor 24 continue to determine which of the thoroughfares intersect the thoroughfare being navigated within a selected angle, namely 45 degrees. Accordingly, in this embodiment, neither Abbey Lane or Front Street would have its name displayed. As stated, Abbey Lane does not intersect Mission Road, and thus would not have its name displayed. Likewise, although Front Street does intersect Mission Road, it does not intersect Mission Road within the preferred angle, namely, 45 degrees from perpendicular to the road being navigated.

As will be appreciated, in each of the foregoing embodiments, the thoroughfares displayed on display 20 which are oriented in substantially the same direction as the thoroughfare being navigated, and do not intersect the thoroughfare being navigated, and are thus not oriented crosswise to the thoroughfare being navigated, do not have their names displayed. As illustrated, thoroughfares 34, 36, 38 do not have their name displayed in any of the preferred embodiments. As will be seen, this invention thus prevents the names of those thoroughfares 34, 36, 38 from crossing with the text of, for example, Abbey Lane and Roosevelt Drive. Each of the thoroughfares consists of a plurality of coordinates, namely coordinates in the form of $(x_n, y_n)$. This storage technique is conventional, and will be readily understood. For illustrative purposes, FIG. 3 illustrates the intersection between Mission Road and Darby Road as $(x_1, y_1)$, the intersection between Johnson Drive and Mission Road is $(x_1, y_2)$, the intersection between Mission Road and Roosevelt Drive as $(x_1, y_3)$, and the intersection between Eagle Trafficway and Mission Road is $(x_1, y_4)$. In operation of the invention, processor 24 utilizes the coordinate data to determine the position and orientation of the various thoroughfares. From this data, the processor instructs the display how to display the data, and also can easily determine the orientations of the various roads for use in determining which names to display.

As will be appreciated, the example provided in FIG. 3 is quite simplistic. In actual use, in a very populated and dense city area, many more thoroughfares may be displayed, thus making the invention particularly useful for displaying the name of those thoroughfares in which the operator of the vehicle is most likely to be interested.

In accordance with another aspect of the invention, processor 24, utilizing the known location and direction of the vehicle, and the cartographic data stored in memory 26, determines the next thoroughfare which, depending upon the foregoing embodiment, is oriented in a direction different than the thoroughfare being navigated, or is oriented substantially crosswise direction to the thoroughfare being navigated, or is within a selected angle from a line drawn perpendicularly to the thoroughfare being navigated, or intersects with the thoroughfare being navigated, either at any angle, or within a selected angle of orientation. Thus, for example, in the example shown in FIG. 3, as the vehicle is traveling North on Mission Road, the next crosswise thoroughfare to be reached is Johnson Drive. In accordance with an important aspect of the invention, a display area, or window 40 is provided at a selected location of display 20. In this area, or window 40, the name of this next thoroughfare to be reached is displayed. Thus, in the example of FIG. 3, the name "Johnson Drive" is prominently displayed, so that the operator of the vehicle can easily and readily determine the next cross street to be reached. This feature of the invention is particularly useful for preventing the operator from having to carefully study the detailed cartographic data in order to determine which crosswise thoroughfare or intersection he or she will next reach. Additionally, the size of the text utilized in the display area or window 40 is preferably larger than the size of the text utilized for the names associated with the thoroughfares on the display. Additionally, different colors might be utilized for the display area or window 40, or text located therein, to distinguish that the area or window 40 from the remainder of the display. Additionally, in accordance with yet another aspect of the invention, an identifier, in this case the word "NEXT:" is utilized in the display area to readily identify the meaning of the name being displayed in the area or window 40, namely that it is the next thoroughfare to be reached.

In summary, the navigation device and method of the present invention uniquely and selectively displays the names of thoroughfares on the display of the navigation device. The invention is particularly useful for providing the operator of a vehicle with the names of thoroughfares in which the operator is most likely to be interested, while preventing the display from being jumbled with text and preventing the names of thoroughfares from overlapping, and becoming unreadable. Particularly, the invention favors, for display, the names of those thoroughfares which are oriented in a direction different from the thoroughfare being navigated, substantially crosswise to the thoroughfare being navigated, or which intersect with the thoroughfare being navigated. Additionally, as discussed, the invention may employ the utilization of a selected angle, preferably 45 degrees in either direction from a line drawn perpendicularly from the road being navigated, to determine which thoroughfare names to display, and which to preclude from the display. Additionally, the unique aspect of the invention provides the name, in selected display area, of the next crosswise thoroughfare, intersection, of the thoroughfare to be reached.

From the foregoing it will be seen that this invention is one well adapted to attain all is ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A navigation device for navigating a vehicle on a thoroughfare, said device comprising:
   a memory containing cartographic data indicative of a plurality of thoroughfares, including said thoroughfare upon which said vehicle is being navigated, wherein at least one of said thoroughfares intersects said thoroughfare upon which said vehicle is being navigated, and wherein each of said thoroughfares has an associated name stored in memory;
   a processor connected to said memory; and
   a display, connected to said processor, for displaying said cartographic data, wherein said display displays the name of each of said thoroughfares that intersects with said thoroughfare upon which said vehicle is being navigated, but does not display the name associated with said thoroughfare upon which said vehicle is being navigated.

2. The navigation device as set forth in claim 1, wherein said display displays the names of only the thoroughfares that intersect with said thoroughfare upon which said vehicle is being navigated with a selected angle, in either direction, from perpendicular to the thoroughfare upon which said vehicle is being navigated.

3. The navigation device as set forth in claim 2, wherein said selected angle is approximately 45 degrees.

4. The navigation device as set forth in claim 1, wherein said data indicative of said thoroughfares includes thoroughfares which do not intersect said thoroughfare upon which said vehicle is being navigated, and wherein said display does not display the names of said non-intersecting thoroughfare.

5. A navigation device, for navigating a vehicle on a thoroughfare, said device comprising:
   a memory containing cartographic data indicative of a plurality of thoroughfares, including said thoroughfare on which said vehicle is being navigated, wherein each said thoroughfare has an associated name stored in said memory, and wherein a first set of said thoroughfares are generally aligned in a first direction, and a second set of said thoroughfares are generally aligned in a second direction;
   a processor for retrieving at least a portion of said cartographic data from said memory; and
   a display, connected to said processor, wherein said display displays images indicative of said thoroughfares and displays the names of each thoroughfare in a selected one of said sets of thoroughfares.

6. The navigation device as set forth in claim 5, wherein each said thoroughfare in said first set of thoroughfares intersects said thoroughfare upon which said vehicle is being navigated, and wherein said selected one of said sets is said first set.

7. The navigation device as set forth in claim 6, wherein each of said thoroughfare in said first set intersects said thoroughfare upon which said vehicle is being navigated within a selected angle, in either direction, from a line perpendicular to the road being navigated.

8. The navigation device as set forth in claim 7, wherein said angle is approximately 45 degrees.

9. A navigation device for navigating a vehicle on a thoroughfare, said device comprising:
   a memory containing cartographic data indicative of a plurality of thoroughfares, including said thoroughfare upon which said vehicle is being navigated, wherein a first set of said thoroughfares intersects with the thoroughfare upon which said vehicle is being navigated, and a second set of thoroughfares do not intersect with the thoroughfare upon which said vehicle is being navigated, wherein each said thoroughfare has an associated name stored in said memory;
   a processor connected to said memory; and
   a display, connected to said processor, for displaying said cartographic data, wherein said display displays the name of each said thoroughfare in said first set, but does not display the name associated with the thoroughfares in said second set.

10. The navigation device as set forth in claim 9, wherein said display displays only the names of said thoroughfares in said first set that intersect the thoroughfare upon which said vehicle is being navigated within a selected angle from perpendicular to the thoroughfare being navigated.

11. The navigation device as set forth in claim 9, wherein said selected angle is approximately 45 degrees.

12. A method of displaying navigation data on the display of a navigation device, for navigating a thoroughfare, said device having a memory containing data indicative of a plurality of thoroughfares, including said thoroughfare being navigated, and wherein a first plurality of said thoroughfares intersect with the thoroughfare being navigated, and a second plurality of said thoroughfares do not intersect with the thoroughfare being navigated, and wherein each said thoroughfare has an associated name stored in said memory, the method comprising:

displaying images representative of said thoroughfare;

selecting, based upon a direction in which said navigation device is being navigated, a plurality of said thoroughfares; and displaying the names of each said thoroughfare in said selected plurality of thoroughfares.

13. The method as set forth in claim 12, wherein said step of selecting based upon a criteria comprises selecting the thoroughfares that intersect with said thoroughfare being navigated.

14. The method as set forth in claim 13, wherein said step of selecting further comprises establishing an angle from a line perpendicular to the thoroughfare being navigated and selecting the thoroughfares that intersect with said thoroughfare being navigated within said angle.

15. A navigation device for navigating a vehicle on a thoroughfare, in a first direction, said device comprising:

a memory containing cartographic data indicative of a plurality of thoroughfares, including said thoroughfare upon which said vehicle is being navigated, and wherein each said thoroughfare has an associated name stored in memory;

a processor connected to said memory; and a display, connected to said processor, for displaying said cartographic data, wherein said display displays the name of selected thoroughfares that are oriented in a direction other than the direction said vehicle is being navigated.

16. The navigation device as set forth in claim 15, wherein said selected thoroughfares comprise thoroughfares which intersect with said thoroughfare upon which said vehicle is being navigated.

17. The navigation device as set forth in claim 15, wherein said selected thoroughfares comprise thoroughfares that are oriented within a selected angle relative to a line perpendicular to said thoroughfare upon which said vehicle is being navigated.

18. The navigation device as set forth in claim 17, wherein said selected angle is approximately 45 degrees.

19. A navigation device for navigating a vehicle on a thoroughfare, said device comprising:

a memory containing cartographic data indicative of a plurality of thoroughfares, including said thoroughfare upon which said vehicle is being navigated, wherein at least one of said thoroughfares intersects with said thoroughfare upon which said vehicle is being navigated, and wherein each of said thoroughfares has an associated name stored in memory;

a processor connected to said memory; and a display, connected to said processor, for displaying said cartographic data, wherein said display displays the name of each of said thoroughfares that intersects with said thoroughfare upon which said vehicle is being navigated, but does not display the name associated with thoroughfares that do not intersect the thoroughfare upon which said vehicle is being navigated.

20. A navigation device for navigating a vehicle, having a location, on a thoroughfare, said device comprising:

a memory containing cartographic data indicative of a plurality of thoroughfares, including said thoroughfare upon which said vehicle is being navigated, wherein a plurality of said thoroughfares are oriented in at least a substantially cross-wise relationship with said thoroughfare upon which said vehicle is being navigated, and wherein each of said thoroughfares has an associated name stored in memory;

a processor connected to said memory; and a display, connected to said processor, for displaying said cartographic data, wherein said processor determines the location of said vehicle on said thoroughfare upon which said vehicle is being navigated, determines the direction said vehicle is traveling, determines the next one of said plurality of at least substantially crosswise thoroughfares to be reached by said vehicle, and displays the name of said next thoroughfare in a selected area on said display.

21. The navigation device as set forth in claim 20, wherein said processor displays representations of said thoroughfares on said display, and wherein at least one of said thoroughfares has its said name displayed in association with said one thoroughfare in a text of a first size, and wherein said name of said next thoroughfare displayed in said selected area is displayed in a next of a second size which is larger than said first size.

22. The navigation device as set forth in claim 20, wherein the name of said next thoroughfare displayed in a selected area is displayed in association with a visual indicator to indicate that said thoroughfare is next.

23. The navigation device as set forth in claim 20, wherein said at least substantially crosswise thoroughfares intersect with said thoroughfare upon which said vehicle is being navigated.

* * * * *

UNITED STATES PATENT AND TRADEMARK OFFICE
Certificate

Patent No. 6,188,956                                                 Patented: February 13, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Thomas H. Walters, Gardner, Kansas and Wai Lee, Olathe, Kansas.

Signed and Sealed this Fifteenth Day of January 2002.

<div style="text-align:right">

WILLIAM A. CUCHLINSKI, JR.
*Supervisory Patent Examiner*
Art Unit 3661

</div>